(12) United States Patent
Nishimura et al.

(10) Patent No.: US 8,573,714 B2
(45) Date of Patent: Nov. 5, 2013

(54) BRAKE DEVICE

(75) Inventors: Ayako Nishimura, Gotemba (JP);
Motonari Ohbayashi, Susono (JP);
Masayuki Naito, Takahama (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 318 days.

(21) Appl. No.: 13/145,958

(22) PCT Filed: Feb. 6, 2009

(86) PCT No.: PCT/JP2009/052043
§ 371 (c)(1),
(2), (4) Date: Jul. 22, 2011

(87) PCT Pub. No.: WO2010/089876
PCT Pub. Date: Aug. 12, 2010

(65) Prior Publication Data
US 2011/0278113 A1 Nov. 17, 2011

(51) Int. Cl.
*B60T 8/60* (2006.01)
(52) U.S. Cl.
USPC .............................. 303/155; 303/10; 303/11
(58) Field of Classification Search
USPC ................. 303/155, 10, 11, 2, 115.4, 116.1; 701/70, 71
See application file for complete search history.

(56) References Cited

U.S. PATENT DOCUMENTS

| | | | |
|---|---|---|---|
| 5,711,582 A | 1/1998 | Koike | |
| 5,967,628 A | 10/1999 | Abe et al. | |
| 6,129,425 A * | 10/2000 | Onuma | 303/155 |
| 6,192,308 B1 * | 2/2001 | Onuma | 701/70 |
| 7,204,566 B2 * | 4/2007 | Otomo et al. | 303/119.3 |
| 7,500,725 B2 * | 3/2009 | Otomo et al. | 303/119.3 |

FOREIGN PATENT DOCUMENTS

| | | |
|---|---|---|
| JP | A-08-310371 | 11/1996 |
| JP | A-09-254762 | 9/1997 |
| JP | A-10-181576 | 7/1998 |
| JP | A-11-286267 | 10/1999 |
| JP | A-2007-038764 | 2/2007 |
| JP | A-2008-230514 | 10/2008 |
| JP | A-2008-296884 | 12/2008 |
| WO | WO 2008/126572 A1 | 10/2008 |

OTHER PUBLICATIONS

International Search Report issued in Application No. PCT/JP2009/052043; Dated Mar. 10, 2009 (With Translation).

* cited by examiner

*Primary Examiner* — Melanie Torres Williams
(74) *Attorney, Agent, or Firm* — Oliff & Berridge, PLC

(57) ABSTRACT

To make a brake device generate a required braking force, a hydraulic control section switches, according to the relative magnitude between the required braking force and a braking force exerted by braking operation, between drive of a pump motor and non-drive of the pump motor and a master cut valve reduces the flow of brake fluid in the direction to a master cylinder. By this, a wheel cylinder maintains hydraulic pressure capable of generating the required braking force. As a result, the pump motor is not necessarily always driven when the required braking force is generated, and the operating time period of the pump motor is reduced. As a result, a load on the pump motor is reduced to enhance durability of the pump motor.

3 Claims, 6 Drawing Sheets

BRAKE DEVICE

TECHNICAL FIELD

The present invention relates to a brake device. In particular, the present invention relates to a brake device capable of generating a braking force equal to or larger than a braking force generated by the brake operation of a driver.

BACKGROUND ART

A brake device provided with a vehicle is mainly used when a moving vehicle is decelerated and disposed to stop the vehicle by applying a braking force to wheels by the brake operation executed by depressing a brake pedal by the driver of the vehicle. Although the brake device is disposed to stop the vehicle by the brake operation of the driver as described above, in some of conventional brake devices, the braking force, which is generated by the depression force when a driver depresses a brake pedal at the time of a quick stop, is insufficient to a braking force necessary to the quick stop, the braking force is secured by increasing the brake fluid pressure applied to wheel cylinders provided with the brake devices by pumps.

Further, some of the conventional brake devices execute an anti-lock control which is a control for suppressing wheels from being locked by controlling the braking force applied to the wheels when the wheels are locked in at the time of a quick stop and execute a vehicle stop keeping control, which is a control for keeping a vehicle stop state by applying a braking force to the wheels even when a foot is removed from a brake pedal when the vehicle stops for the purpose of reducing a burden on the driver in a hill start assist, waiting at a red light, a traffic jam, and the like. In these controls, the braking force is controlled by controlling the brake fluid pressure by the pumps likewise the case in which the brake pressure is increased in the quick stop.

For example, a brake device for vehicle described in Patent Document 1 is disposed with pumps capable of circulating a brake fluid of a piping system, a proportional control valve capable of keeping a brake fluid pressure of the piping system on the wheel cylinders side, and a pressure reduction control valve capable of reducing the brake fluid pressure applied to the wheel cylinders. With the configuration, when the brake fluid pressure applied to the wheel cylinders at the time of a quick stop is increased, the brake fluid pressure applied to the wheel cylinders can be increased by placing the brake fluid to be flown to the wheel cylinders side in the state that the brake fluid can be increased by operating the pumps and by keeping the brake fluid pressure of the piping system on wheel cylinders side by the proportional control valve. Further, when an anti-lock control is executed, wheels can be suppressed from being locked by reducing a braking force when the wheels are locked by returning a part of the brake fluid of the piping system on the wheel cylinders side to the pumps side by opening pressure reduction control valves disposed to a piping system toward the wheel cylinders and positioned upstream of the pumps while circulating the brake fluid by operating the pumps.

As described above, a braking force different from the brake operation of a driver can be generated in the brake device by disposing the pumps capable of circulating the brake fluid to the brake device and the proportional control valve capable of keeping the brake fluid pressure of the piping system on the wheel cylinders side to the brake device and controlling them in response to the state at the time of braking.

Patent Document 1: Japanese Patent Application Laid-open No. H09-254762

DISCLOSURE OF THE INVENTION

Problems to be Solved by the Invention

However, in the brake device for vehicle described in Patent Document 1, when a braking force different from a brake operation of a driver is generated, pump motors are operated at all times. Therefore, loads on the pump motor are liable to be increased.

An object of the present invention, which was made in view of the above problems, is to provide a brake device capable of securing the durability of pump motors used to control a braking force.

Means for Solving Problem

In order to solve the above mentioned problem and achieve the object, a brake device according to the present invention includes a brake operating means that is a section for executing a brake operation as an operation when a vehicle is braked; a fluid pressure generating means connected to the brake operating means as well as capable of increasing a fluid pressure of an operating fluid in response to the brake operation to the brake operating means; a braking force generating means connected to an operating fluid path connected to the fluid pressure generating means as well as generating a braking force by being operated by a fluid pressure of the operating fluid; a flow rate adjusting means capable of adjusting a flow of the operating fluid in the direction from the braking force generating means side to the fluid pressure generating means; a pressure increasing means capable of increasing a fluid pressure of the operating fluid equal to or larger than a fluid pressure generated by the fluid pressure generating means; and a fluid pressure controlling means disposed to control a fluid pressure of the operating fluid by controlling the flow rate adjusting means and the pressure increasing means, that adjusts, when a necessary braking force, which is the braking force necessary to a braking acting as a target of the vehicle is equal to or larger than a brake operation braking force acting as the braking force generated by the braking force generating means by the brake operation, a flow of the operating fluid in the direction of the fluid pressure generating means by the flow rate adjusting means in a state that the fluid pressure is increased by the pressure increasing means, and that keeps the fluid pressure by which the braking force generating means can generate the necessary braking force by adjusting the flow of the operating fluid in the direction of the fluid pressure generating means by the flow rate adjusting means without causing the pressure increasing means to increase the fluid pressure when the necessary braking force is smaller than the brake operation braking force.

Further, in the brake device according to the present invention, the braking force generating means keeps the fluid pressure by which the necessary braking force can generate by that the fluid pressure controlling means makes the degree of adjustment, at the time the flow rate adjusting means adjusts the flow of the operating fluid in a fluid pressure direction, different between when the pressure increasing means increases the fluid pressure and when the pressure increasing means does not increase the fluid pressure.

Further, in the brake device according to the present invention, when the flow of the operating fluid in the direction of the fluid pressure generating means is adjusted by the flow rate adjusting means, the fluid pressure controlling means keeps the fluid pressure by which the braking force generating means can generate the necessary braking force by more reducing the flow of the operating fluid in the direction of the fluid pressure generating means when the fluid pressure is not increased by the pressure increasing means than when the fluid pressure is increased by the pressure increasing means.

Further, the brake device according to the present invention further includes a flow rate adjusting means-output value calculate means capable of calculating an output value to the flow rate adjusting means when the flow rate adjusting means is controlled in response to the state of increase of the fluid pressure in the pressure increasing means, wherein the fluid pressure controlling means makes the degree of adjustment, at the time the flow rate adjusting means adjusts the flow of the operating fluid in the direction of the fluid pressure generating means, different between when the pressure increasing means increases the fluid pressure and when the pressure increasing means does not increase the fluid pressure by outputting the output value calculated by the flow rate adjusting means-output value calculating means to the flow rate adjusting means.

Further, in the brake device according to the present invention, the necessary braking force is a braking force necessary to keep the stop of the vehicle at the time of the vehicle stop keeping control that is a control for continuously keeping the stop of the vehicle by causing the braking force generating means to generate the braking force even in the state that the brake operation is not executed when the vehicle stops.

Effect of the Invention

A brake device according to the present invention can achieve an effect of securing the durability of pump motors used to control a braking force.

EXPLANATION OF LETTERS OR NUMERALS

Figure 1:
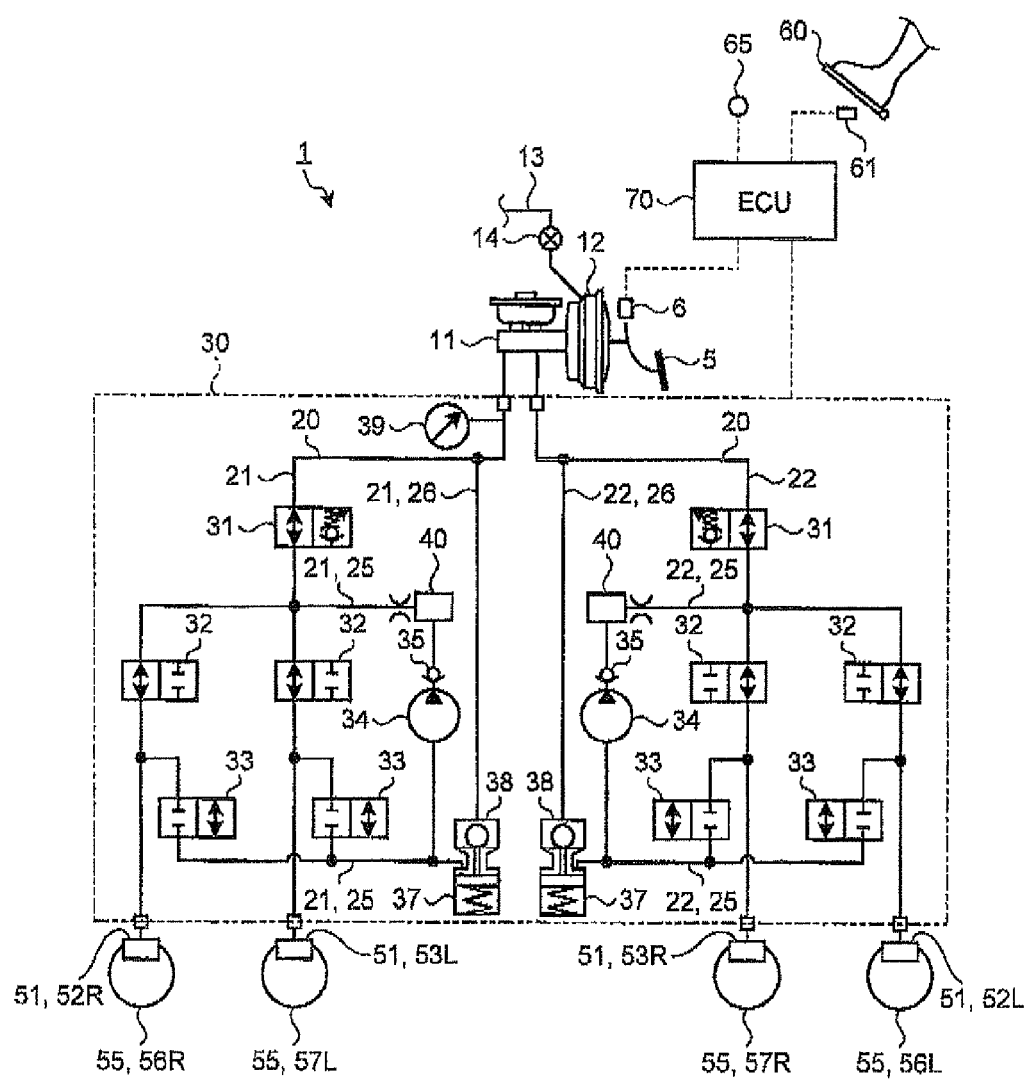
FIG. 1 is a schematic view of brake device according to an embodiment of the present invention.

1 Brake device
5 Brake pedal
6 Brake stroke sensor
11 Master cylinder
20 Hydraulic pressure path
21 First hydraulic pressure path
22 Second hydraulic pressure path
25 Return path
26 Supply path
30 Brake actuator
31 Master cut valve
32 Hold valve
33 Pressure reduction valve
34 Pump motor
39 Master cylinder pressure sensor
51 Wheel cylinder
55 Brake disc
60 Accelerator pedal
61 Accelerator opening degree sensor
65 Control mode switch
70 ECU
71 Processing unit
72 Brake stroke amount obtaining unit
73 Master cylinder pressure obtaining unit
74 Accelerator opening degree obtaining unit
75 Control mode obtaining unit
76 Necessary braking force calculating unit
77 Brake operation braking force calculating unit
78 Master cut valve output value calculating unit
79 Hydraulic pressure controlling unit
80 Vehicle stop keeping control determining unit
81 Braking force determining unit
90 Storage unit
91 Input/output unit

BEST MODE(S) FOR CARRYING OUT THE INVENTION

An embodiment of a brake device according to the present invention will be explained below in detail based on the drawings. Note that the present invention is by no means limited by the embodiment. Further, the components in the embodiment include the components which can be easily replaced by a person skilled in the art and which are substantially the same components.

Embodiment

FIG. 1 is a schematic view of a brake device according to an embodiment of the present invention. A brake device 1 illustrated in the view is disposed to a vehicle (illustration omitted) so as to brake the vehicle. This will be described below in detail. The brake device 1 includes wheel cylinders 51, which are disposed in the vicinities of respective wheels disposed to the vehicle and operated by the fluid pressure, that is, the hydraulic pressure of a brake fluid (illustration omitted) as an operating fluid in the brake device 1, and brake discs 55 which are disposed in combination with the wheel cylinders 51 as well as rotated integrally with the wheels when the wheels rotate. When the vehicle is decelerated, the vehicle can be braked by reducing the rotation of the brake discs 55 by the frictional force generated by operating the wheel cylinders 51 by the hydraulic pressure.

The brake device 1 disposed as described above is an input means to the brake device 1 and includes a brake pedal 5 disposed as a brake operating means as a section for executing a brake operation which is an operation when the vehicle is braked. The brake pedal 5 is disposed in the vicinity of a foot of a driver in the state that the driver sits on a driver's seat of the vehicle. A brake stroke sensor 6 as a brake stroke detection means, which can detect the stroke of the brake pedal 5 is disposed in the vicinity of the brake pedal 5 disposed as described above.

Further, the brake pedal 5 is connected to a brake booster 12 to which a negative pressure path 13 is connected. The negative pressure path 13 can transmit a negative pressure generated when an engine (illustration omitted) provided as a power source at the time the vehicle travels operates. The negative pressure path 13 is connected to an intake path (illustration omitted) of the engine to thereby transmit the negative pressure generated when the engine operates to the brake booster 12. Further, the negative pressure path 13 disposed as described above is disposed with a negative pressure path check valve 14 as a check valve which shuts off the flow of air in the direction of the brake booster 12 from the intake path side.

Further, the brake booster 12 is connected to a master cylinder 11 which can generate a hydraulic pressure, and the master cylinder 11 is connected with a hydraulic pressure path 20 which is a path of a hydraulic pressure applied to the wheel cylinders 51 when the vehicle is braked. The hydraulic pressure path 20 is disposed as an operating fluid path as a path of the brake fluid as the operating fluid. The hydraulic pressure path 20 connected to the master cylinder 11 is filled with the brake fluid used as the operating fluid. Further, the hydraulic pressure path 20 is configured by being separated to two systems, and a first hydraulic pressure path 21 and a second hydraulic pressure path 22, which are the hydraulic pressure path 20 of the two systems, are independently connected to the master cylinder 11, respectively.

The brake pedal 5 is connected to the hydraulic pressure path 20 via the brake booster 12 and the master cylinder 11. In the components, the brake booster 12 is configured as a known vacuum servo unit which can increase the depression force input to the brake pedal 5 making use of the difference between the negative pressure transmitted from the negative pressure path 13 and the atmospheric pressure and transmits the thus increased depression force to the master cylinder 11. Further, the master cylinder 11 is disposed to generate the hydraulic pressure by the force transmitted from the brake booster 12 and transmits the thus generated hydraulic pressure to the hydraulic pressure path 20. That is, the master cylinder 11 is disposed as a fluid pressure generating means which is connected to the brake pedal 5 via the brake booster 12 as well as can increase the hydraulic pressure of the brake fluid in response to the brake operation to the brake pedal 5.

Further, the hydraulic pressure path 20, which is connected to the master cylinder 11, is connect with the wheel cylinders 51 at its ends, the wheel cylinders 51 being disposed in the vicinity of the wheels which are disposed at the alternate positions in the vehicle in the first hydraulic pressure path 21 and the second hydraulic pressure path 22. The wheel cylinders 51 and the brake discs 55 disposed in the vicinities of the respective wheels will be explained here. The wheel cylinders 51, which are disposed in the vicinities of a left front wheel, a right front wheel, a left rear wheel, and a right rear wheel, are sequentially configured as a left front wheel cylinder 52L, a right front wheel cylinder 52R, a left rear wheel cylinder 53L, and a right rear wheel cylinder 53R. Likewise, the brake discs 55, which are disposed in the vicinities of the left front wheel, the right front wheel, the left rear wheel, and the right rear wheel are sequentially configured as a left front wheel brake disc 56L, a right front wheel brake disc 56R, a left rear wheel brake disc 57L, and a right rear wheel brake disc 57R. In the wheel cylinders 51, which are disposed in the vicinities of the wheels disposed at the alternate positions in the vehicle in the first hydraulic pressure path 21 and the second hydraulic pressure path 22, the first hydraulic pressure path 21 is connected with the right front wheel cylinder 52R and the left rear wheel cylinder 53L, and the second hydraulic pressure path 22 is connected with the left front wheel cylinder 52L and the right rear wheel cylinder 53R. The wheel cylinders 51 disposed as described above is disposed as a braking force generating means which generates the braking force by being operated by the hydraulic pressure of the brake fluid.

Further, the hydraulic pressure path 20 is disposed with brake actuators 30 which can control the hydraulic pressure in the hydraulic pressure path 20 when the vehicle is braked, and the brake actuators 30 include master cut valves 31 and hold valves 32 which are normally-open solenoid valves and pressure reduction valves 33 which are normally-closed solenoid valves. In these valves, each one of the master cut valves 31 is disposed to the first hydraulic pressure path 21 and the second hydraulic pressure path 22 and is disposed as flow rate adjusting means capable of adjusting the flow of the brake fluid in the direction of the master cylinder 11 from the wheel cylinders 51 side.

Further, the hold valves 32 are disposed in the paths from the master cylinder 11 to the wheel cylinders 51 via the master out valves 31 in the hydraulic pressure path 20, and four sets of the hold valves 32 are also disposed corresponding to the four wheel cylinders 51.

Further, the pressure reduction valves 33 are disposed to return paths 25 which are the paths branched from the paths toward the wheel cylinders 51 from the hold valves 32 and connected to the paths between the master cut valves 31 and the hold valves 32. As described above, since the return paths 25, to which the pressure reduction valves 33 are disposed, are branched from the paths between the four hold valves 32 and the four wheel cylinders 51, respectively and the pressure reduction valves 33 are disposed to the respective branched paths, four sets of the pressure reduction valves 33 are disposed to the hydraulic pressure path 20. That is, the four sets of the pressure reduction valves 33 are disposed corresponding to the four wheel cylinders 51 likewise the hold valves 32.

Further, in the portions of the return paths 25 on the downstream side of the pressure reduction valves 33, that is, in the portions on the sides which connected to the paths between the master cut valves 31 and the hold valves 32 and located nearer than the pressure reduction valves 33, the two return paths 25 in the first hydraulic pressure path 21 are connected to each other, and the two return paths 25 in the second hydraulic pressure path 22 are connected to each other and are configured as one paths, respectively. The portions of the return paths 25 which are configured as the one paths as described above, are disposed with pump motors 34 as the brake actuators 30, return path check valves 35 which are check valves disposed to the return paths 25, and damper chambers 40 which reduce the pulsation of the brake fluid ejected from the pump motors 34. In these components, the return path check valves 35 and the damper chambers 40 are disposed on the sides connected to the paths between the master cut valves 31 and the hold valves 32 which are located nearer than the pump motors 34 in the return paths 25, and the return path check valves 35 are disposed between the pump motors 34 and the damper chambers 40 in the return paths 25.

Further, the pump motors 34 are disposed to be electrically driven and disposed to supply the brake fluid in the return paths 25 from the pressure reduction valves 33 side to the master cut valves 31 side or the hold valves 32 side by driving the pump motors 34. With the configuration, the pump motors 34 are disposed as pressure increasing means which can pressurize the brake fluid in the hydraulic pressure path 20 and can increase the hydraulic pressure of the brake fluid equal to or larger than the hydraulic pressure generated by the master cylinder 11. Further, the return path check valves 35 permit the brake fluid to flow only in the direction of the master cut valves 31 or the hold valves 32 from the pump motors 34 and shut off the flow of the brake fluid in an opposite direction. Further, the damper chambers 40 reduce the pulsation of the brake fluid which is ejected from the pump motors 34 and flows in the direction of the master cut valves 31 or the hold valves 32 passing via the return path check valves 35. Since the pump motors 34, the return path check valves 35, and the damper chambers 40 are disposed as described above, each ones of them are disposed to the first hydraulic pressure path 21 and the second hydraulic pressure path 22, respectively. That is, each two sets of the pump motors 34, the return path check valves 35, and the damper chambers 40 are disposed in total.

Further, supply paths 26, which are paths connected to the return paths 25, are branched from the upstream side of the master cut valves 31 in the hydraulic pressure path 20, that is, from the portions between the master cylinder 11 and the master cut valves 31 in the hydraulic pressure path 20, and the supply paths 26 are connected to the return paths 25. Further, the supply paths 26 are disposed with reservoirs 37 and supply path check valves 38 which are check valves disposed to the supply paths 26, and the supply path check valves 38 are disposed on the sides where the supply path check valves 38 are connected in the paths between the master cylinder 11 and the master cut valves 31 in the supply paths 26 than the reservoirs 37, which are nearer to the paths.

In the components, the reservoirs 37 are disposed to reserve the brake fluid which flows in the supply paths 26 in a predetermined amount, and the supply path check valves 38 permit only the brake fluid to flow in the direction of the return paths 25 from the end sides where the supply path check valves 38 are connected in the paths between the master cylinder 11 and the master cut valves 31 in the supply paths 26 and shut off the flow of the brake fluid in a opposite direction. Since the reservoirs 37 and the supply path check valves 38 are disposed as described above, each ones of the reservoirs 37 and the supply path check valves 38 are disposed to the first hydraulic pressure path 21 and the second hydraulic pressure path 22, respectively. That is, each two sets of the reservoirs 37 and the supply path check valves 38 are disposed in total.

Further, a master cylinder pressure sensor 39 which is an operation pressure detection means is disposed between the master cylinder 11 and the master cut valve 31 in the first hydraulic pressure path 21. The master cylinder pressure sensor 39 is disposed to detect the hydraulic pressure between the master cylinder 11 and the master cut valve 31 in the first hydraulic pressure path 21 as the operation pressure generated when the driver executes a brake operation and depresses the brake pedal 5.

Further, in a compartment of the vehicle, an accelerator pedal 60 is disposed alongside the brake pedal 5 so as to be operated when the output of the engine is adjusted, and an accelerator opening degree sensor 61, which is an accelerator opening degree detection means capable of detecting the opening degree of the accelerator pedal 60, is disposed in the vicinity of the accelerator pedal 60. Further, a control mode switch 65, which is a control mode switch means for switching a control mode when a brake control is executed, is disposed in the compartment of the vehicle. The control mode switch 65 is disposed at a position where the driver can operate the control mode switch 65 in the state that the driver sits on the driver's seat of the vehicle so that the driver can switch a mode for executing a vehicle stop keeping control which is a control by which the vehicle is kept continuously stopped by continuously generating the braking force to the wheel cylinders 51 even in the state that no brake operation is executed to the brake pedal 5 when the vehicle stops and an ordinary brake control mode. That is, the control mode switch 65 is disposed to switch ON and OFF of the vehicle stop keeping control.

The brake stroke sensor 6, the master cut valves 31, the hold valves 32, the pressure reduction valves 33, the pump motors 34, the master cylinder pressure sensor 39, the accelerator opening degree sensor 61, and the control mode switch 65, which are disposed as described above, are mounted on the vehicle as well as connected to an ECU (electronic control unit) 70 for controlling the respective components of the vehicle and disposed to be controlled by the ECU 70.

Figure 2:
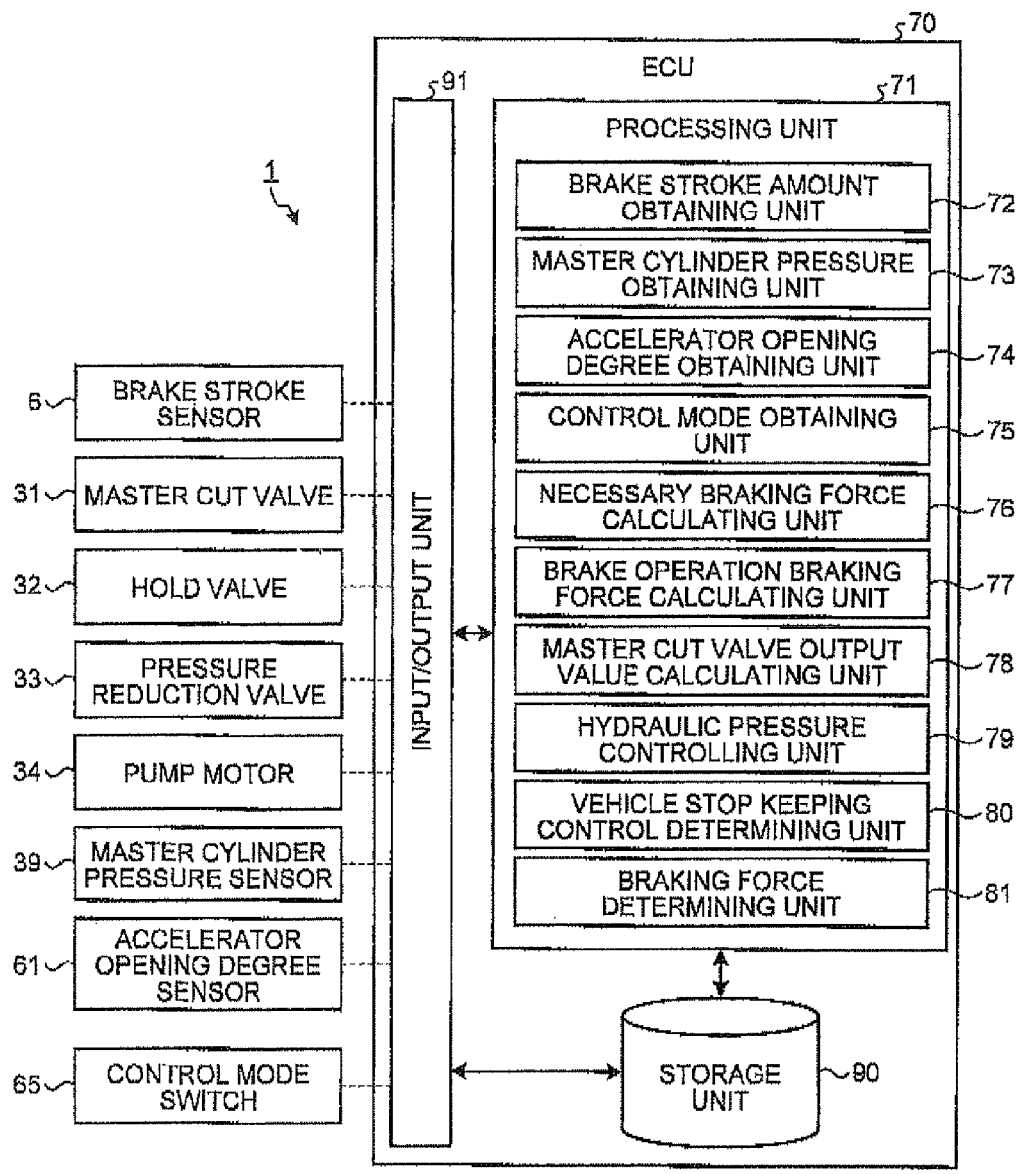
FIG. 2 is a main portion configuration view of the brake device illustrated in FIG. 1.

FIG. 2 is a main portion configuration view of the brake device illustrated in FIG. 1. The ECU 70 is disposed with a processing unit 71, a storage unit 90, and an input/output unit 91 which are connected to each other and can transmit a signal to each other. Further, the brake stroke sensor 6, the master cut valves 31, the hold valves 32, the pressure reduction valves 33, the pump motors 34, the master cylinder pressure sensor 39, the accelerator opening degree sensor 61, and the control mode switch 65, which are connected to the ECU 70, are connected to the input/output unit 91 which Inputs and outputs a signal between these sensors and the like. Further, the storage unit 90 is stored with a computer program for controlling the brake device 1 according to the embodiment. The storage unit 90 can be configured of a non-volatile memory such as a hard disc device, an optomagnetic disc device, a flash memory, and the like (read-only storage medium such as CD-ROM and the like), and a volatile memory such as a random access memory (RAM), or a combination of these devices.

Further, the processing unit 71 is composed of a memory and a central processing unit (CPU) and includes a brake stroke amount obtaining unit 72 which is a brake operation obtaining means capable of obtaining the stroke amount of the brake pedal 5 from a result of detection in the brake stroke sensor 6, a master cylinder pressure obtaining unit 73 which is a master cylinder pressure obtaining means capable of obtaining a master cylinder pressure which is the pressure of the brake fluid generated by the master cylinder 11 from a result of detection in the master cylinder pressure sensor 39, an accelerator opening degree obtaining unit 74 which is an accelerator operation obtaining means capable of obtaining an accelerator opening degree from a result of detection in the accelerator opening degree sensor 61, and a control mode obtaining unit 75 which is a control mode obtaining means for obtaining a brake control mode selected depending on the state of the control mode switch 65.

Further, the processing unit 71 includes a necessary braking force calculating unit 76 which is a necessary braking force calculating means for calculating a necessary braking force that is a braking force necessary to keep the stop of the vehicle, a brake operation braking force calculating unit 77 which is a brake operation braking force calculating means for calculating a brake operation braking force that is a braking force generated by that the driver of the vehicle operates the brake pedal 5, and a master cut valve output value calculating unit 78 which is a flow rate adjusting means-output value calculating means capable of calculating an output value to the master cut valves 31 when the master cut valves 31 are controlled in response to the state of increase of the hydraulic pressure of the brake fluid in the pump motors 34, that is, in response to the drive state of the pump motors 34.

The processing unit 71 is disposed to control the hydraulic pressure of the brake fluid in the hydraulic pressure path 20 by controlling the brake actuators 30. Further, the processing unit 71 includes a hydraulic pressure controlling unit 79 which is a fluid pressure controlling means which switches, when the vehicle stop keeping control is executed, increasing the hydraulic pressure of the brake fluid by the pump motors 34 and not increasing the hydraulic pressure of the brake fluid by the pump motors 34 in response to the relative magnitude between the necessary braking force and the brake operation braking force as well as keeps a hydraulic pressure by which the wheel cylinders 51 can generate the necessary braking force by reducing the flow of the brake fluid in the direction of the master cylinder 11 by the master cut valves 31, a vehicle stop keeping control determining unit 80 which is a vehicle stop keeping control determination means for determining whether or not the vehicle stop keeping control is executed, and a braking force determining unit 81 which is a braking force determination means for determining a relative magnitude by comparing the necessary braking force with the brake operation braking force.

The master cut valves 31 and the like, which are controlled by the ECU 70, are controlled in, for example, such a manner that the processing unit 71 reads the computer program to a memory assembled to the processing unit 71 and executes a calculation based on results of detection executed by the master cylinder pressure sensor 39 and the like and operates operating sections such as the master cut valves 31 and the like in response to a result of the calculation. At the time, the processing unit 71 appropriately stores a value in a process of calculation in the storage unit 90 and fetches a stored value and executes a calculation. Note that, when the master cut valves 31 and the like are controlled as described above, they may be controlled by dedicated hardware different from the ECU 70 in place of the computer program.

The brake device 1 according to the embodiment is configured as described above, and an operation of the brake device 1 will be explained below. When the vehicle is braked while it travels and is decelerated, a brake is applied by depressing the brake pedal 5. When a brake operation is executed by depressing the brake pedal 5 as described above, the depression force is transmitted from the brake pedal 5 to the brake booster 12. The brake booster 12 is connected with the negative pressure path 13, and the brake booster 12 is disposed to transmit the negative pressure, which is generated in an intake stroke when the engine operates, via the negative pressure path 13. When the depression force is input to the brake booster 12, the brake booster 12 increases the depression force by the difference pressure between the negative pressure and the atmospheric pressure and inputs the increased depression force to the master cylinder 11. The master cylinder 11, to which the force increased to the depression force is input, applies a pressure to the brake fluid in response to the input force and increases a master cylinder pressure which is the pressure of the brake fluid that changes in response to the operation of the master cylinder 11.

When the master cylinder pressure increase, the pressure of the brake fluid in the hydraulic pressure path 20 also increases, and the hydraulic pressure in the hydraulic pressure path 20 becomes as large as the master cylinder pressure. Further, when the hydraulic pressure in the hydraulic pressure path 20 increases as described above, the hydraulic pressure is transmitted also to the wheel cylinders 51 via the master cut valves 31 and the hold valves 32 which are normally-open solenoid valve. In the case, since the pressure reduction valves 33 are normally closed, the brake fluid in the hydraulic pressure path 20 does not flow from the hold valves 32 side to the return paths 25 passing via the pressure reduction valves 33, and thus the hydraulic pressure transmitted from the hold valves 32 to the wheel cylinders 51 is not reduced.

As described above, when the increased hydraulic pressure is transmitted to the wheel cylinders 51, the wheel cylinders 51 is operated by the hydraulic pressure transmitted thereto. That is, the wheel cylinders 51 are operated by the hydraulic pressure of the master cylinder. When the wheel cylinders 51 are operated, the wheel cylinders 51 reduce the rotation speed of the brake discs 55 which are disposed as the sets with the wheel cylinders 51 as well as rotated integrally with the wheels when the wheels rotate. With the operation, since the rotation speeds of the wheels are also reduced, the vehicle is decelerated.

As described above, when the brake pedal 5 is operated, since the braking force, which is a force for reducing the rotation speed of the wheel cylinders 51, is generated to the brake discs 55, the rotation speeds of the wheels can be reduced by reducing the rotation speeds of the brake discs 55, and the vehicle can be braked while it travels.

Further, when the brake pedal 5 is operated as described above, the stroke amount of the brake pedal 5 is detected by the brake stroke sensor 6 disposed in the vicinity of the brake pedal 5. The result detected by the brake stroke sensor 6 is obtained by the brake stroke amount obtaining unit 72 provided with the processing unit 71 of the ECU 70. Further, when the brake pedal 5 is operated, the master cylinder pressure, which is changed in response to the depression force applied to the brake pedal 5, is detected by the master cylinder pressure sensor 39 disposed to the first hydraulic pressure path 21. The result detected by the master cylinder pressure sensor 39 is obtained by the master cylinder pressure obtaining unit 73 provided with the processing unit 71 of the ECU 70. The hydraulic pressure controlling unit 79 provided with the processing unit 71 of the ECU 70 controls the brake actuators 30 in response to the stroke amount of the brake pedal 5 obtained by the brake stroke amount obtaining unit 72, the master cylinder pressure obtained by the master cylinder pressure obtaining unit 73, and results of detection in the other sensors disposed to the vehicle, thereby controlling the hydraulic pressure applied to the wheel cylinders 51.

Further, when the pump motors 34 is driven, the brake fluid in the return paths 25 is caused to flow to the paths between the master cut valves 31 and the hold valves 32. With the operation, since the hydraulic pressure of the brake fluid which flows in the direction of the hold valves 32 can be increased, the hydraulic pressure applied to the wheel cylinders 51 can be increased. Therefore, since a hydraulic pressure larger than the hydraulic pressure generated when the driver depresses the brake pedal 5 can be applied to the wheel cylinders 51, the braking force can be increased. In other words, when a hydraulic pressure, which is equal to or larger than the hydraulic pressure generated when the driver depresses the brake pedal 5, is applied to the wheel cylinders 51 at the time the vehicle is braked, the pump motors 34 are driven. As described above, the pump motors 34 are disposed as a braking force assistant means capable of applying a braking force, which is equal to or larger than the braking force generated by the brake operation executed by the driver of the vehicle, to the wheels.

Further, the brake device 1 according to the embodiment is disposed to execute the vehicle stop keeping control as the control for keeping the stop of the vehicle in addition to brake the vehicle while it travels. Whether or not the vehicle stop keeping control is executed is determined by switching the control mode switch 65 disposed in the compartment of the vehicle. When the state of the control mode switch 65 is in an ordinary brake control mode, that is, when the vehicle stop keeping control is in an OFF state, the brake device 1 operates the wheel cylinders 51 in response to the operation of the brake pedal 5 as described above so that the braking force is generated.

In contrast, when the state of the control mode switch 65 is switched to a vehicle stop keeping control mode and the vehicle stop keeping control is in an ON state, the brake device 1 executes the vehicle stop keeping control. Specifically, when the vehicle stop keeping control is in the ON state and the vehicle approximately stops as well as when the brake pedal 5 is operated in a predetermined stroke or more, the brake device 1 executes the vehicle stop keeping control.

In the operations, the detection that the vehicle stop keeping control is in the ON state is executed by obtaining the state of the control mode switch 65 by the control mode obtaining unit 75 provided with the processing unit 71 of the ECU 70. In the state that the vehicle approximately stops, when the state of the control mode switch 65, which is obtained by the control mode obtaining unit 75 becomes the ON state of the vehicle stop keeping control and the stroke amount of the brake pedal 5 obtained by the brake stroke amount obtaining unit 72 is equal to or larger than a predetermined stroke amount, the vehicle stop keeping control determining unit 80 provided with the processing unit 71 of the ECU 70 determines to execute the vehicle stop keeping control. When the vehicle stop keeping control determining unit 80 determines that the vehicle stop keeping control is executed, the vehicle stop keeping control is executed.

When the vehicle stop keeping control is executed, after the brake pedal 5 is operated, the master cut valves 31 and the pump motors 34 are driven by controlling the master cut valves 31 and the pump motors 34 by the hydraulic pressure controlling unit 79 provided with the processing unit 71 of the ECU 70 or only the master cut valves 31 are driven by being controlled by the master cut valves 31, thereby applying the hydraulic pressure of the brake fluid to the wheel cylinders 51 even in the state that the brake pedal 5 is returned. That is, when the vehicle stop keeping control is executed, the brake fluid does not return from the wheel cylinders 51 side to the master cylinder 11 even when the brake pedal 5 is returned by driving the normally-closed master cut valves 31 in a close direction regardless the drive state of the pump motors 34. Therefore, since the hydraulic pressure of the hydraulic pressure path 20 on the side thereof connected to the wheel cylinders 51 is kept using the master cut valves 31 in the hydraulic pressure path 20 as boundaries, the hydraulic pressure to the wheel cylinders 51 is kept even in the state that the brake pedal 5 is returned. As a result, since the wheel cylinders 51 keep the rotation stop state of the brake discs 55 by the braking force, the stop state of the vehicle is kept.

As described above, although the vehicle stop keeping control is executed by driving the master cut valves 31 in a close direction, at the time of the vehicle stop keeping control, the pump motors 34 are differently driven in response to the state of the braking force. For example, a necessary braking force is different depending on whether the vehicle stops on a flat road or on a slope road, and further the braking force generated by that the driver operates the brake pedal 5 is also different depending on the depression force when the brake pedal 5 is operated. Therefore, when the vehicle stop keeping control is executed by operating the brake pedal 5 at the time the vehicle stops, there are a case in which a braking force necessary to keep the stop of the vehicle can be satisfied by the braking force generated based on the depression force when the brake pedal 5 is operated and a case in which the braking force generated based on the depression force when the brake pedal 5 is operated is insufficient. Accordingly, when the vehicle stop keeping control is executed, whether or not the pump motors 34 are driven is switched depending on whether or not the braking force necessary to keep the stop of the vehicle can be satisfied by the braking force generated based on the depression force when the brake pedal 5 is operated.

That is, when the necessary braking force, which is the braking force necessary to keep the stop of the vehicle, is equal to or larger than the brake operation braking force, which is the braking force generated based on the depression force when the driver operates the brake pedal 5, at the time the vehicle stop keeping control determining unit 80 determines that the vehicle stop keeping control is executed, the hydraulic pressure controlling unit 79 increases the hydraulic pressure of the brake fluid by the pump motors 34, whereas when the necessary braking force is smaller than the brake operation braking force, the hydraulic pressure controlling unit 79 keeps a hydraulic pressure by which the necessary braking force can be generated by the wheel cylinders 51 without increasing the hydraulic pressure of the brake fluid by the pump motors 34.

As to the vehicle stop keeping control, first, the case in which the necessary braking force cannot be satisfied by the brake operation braking force will be explained. When the necessary braking force cannot be satisfied by the brake operation braking force, the pump motors 34 are driven. That is, the pump motors 34 are driven by controlling the pump motors 34 by the hydraulic pressure controlling unit 79 provided with the processing unit 71 of the ECU 70 to thereby increase the hydraulic pressure of the brake fluid which flows in the direction of the hold valves 32. Further, in the state, the flow of the brake fluid in the direction of the master cylinder 11 is reduced by driving by the master cut valves 31 by controlling the master cut valves 31 by the hydraulic pressure controlling unit 79. With the operation, the hydraulic pressure, which is applied to the wheel cylinders 51, is kept in a pressure increased state.

Figure 3:
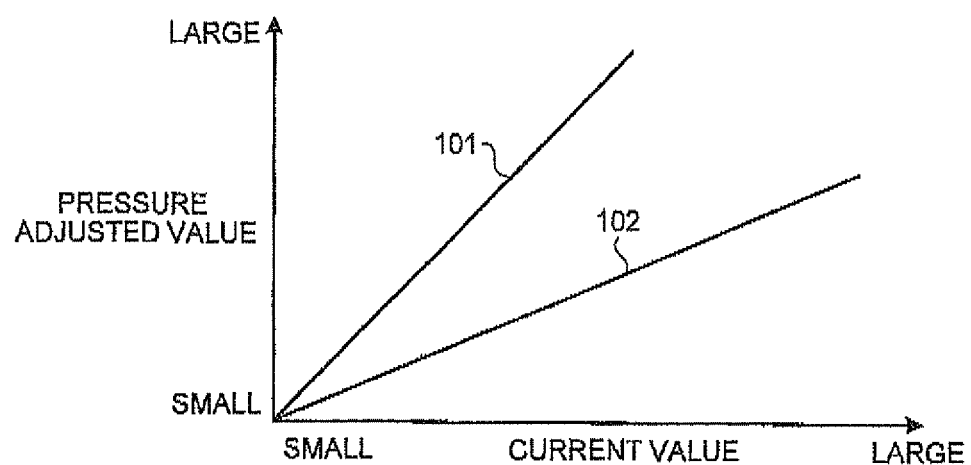
FIG. 3 is an explanatory view illustrating the relation between a current value and a pressure adjustment value when master cut valves are driven.

FIG. 3 is an explanatory view illustrating the relation between a current value and a pressure adjustment value when the master cut valves are driven. A vertical axis illustrated in the view illustrates the pressure adjustment value, which is the value of a pressure by which the hydraulic pressure of the brake fluid nearer to the wheel cylinders 51 side than the master cut valves 31 in the hydraulic pressure path 20 can be adjusted by driving the master cut valves 31, whereas a horizontal axis illustrates the current value to the master cut valves 31 which is necessary to obtain the pressure adjustment value of the vertical axis. When the vehicle stop keeping control is executed, although the master cut valves 31 are driven as described above, the current value at the time the master cut valves 31 are driven is made different depending on the drive state of the pump motors 34. Specifically, the current value at the time the master cut valves 31 are driven is determined based on a map illustrating the relation between the pressure adjustment value and the current value which is previously stored in the storage unit 90 of the ECU 70 and illustrated in FIG. 3. That is, the current value, by which the pressure adjustment value that can generate the necessary braking force by driving the master cut valves 31 can be obtained is calculated referring to the map stored in the storage unit 90.

Here, the map is previously set as maps which are different between when the pump motors 34 are driven and when the pump motors 34 are not driven, and there are set a pump motor drive time control value 101 which illustrates the relation between the pressure adjustment value and the current value applied to the master cut valves 31 when the pump motors 34 is driven and a pump motor non-drive time control value 102 which illustrates the relation between the pressure adjustment value and the current value applied to the master cut valves 31 when the pump motors 34 are not driven. In the pump motor drive time control value 101 and the pump motor non-drive time control value 102 set as described above, the current value, which is applied to the master cut valves 31, is set larger to the pressure adjustment value having the same magnitude in the pump motor non-drive time control value 102 than in the pump motor drive time control value 101.

When the pump motors 34 is driven, the current value at the time the master cut valves 31 are driven is calculated by the master cut valve output value calculating unit 78 provided with the processing unit 71 of the ECU 70 as an output value to the master cut valves 31 based on the pump motor drive time control value 101 in the maps stored in the storage unit 90. When the pump motors 34 is driven, the hydraulic pressure of the brake fluid between the master cut valves 31 and the wheel cylinders 51 can be kept in the state that the hydraulic pressure of the brake fluid is made to a hydraulic pressure by which the necessary braking force can be generated by driving by the master cut valves 31 by the current value calculated based on the pump motor drive time control value 101.

Further, the case will be explained in which the necessary braking force that is the braking force necessary to keep the stop of the vehicle is satisfied by the brake operation braking force which is the braking force generated based on the depression when the driver operates the brake pedal 5. When the necessary braking force is satisfied by the brake operation braking force, the pump motors 34 are not driven. That is, the pump motors 34 are placed in a non-drive state by the hydraulic pressure controlling unit 79 provided with the processing unit 71 of the ECU 70, and the pressure is not increased by the pump motors 34. Further, likewise the case in which the pump motors 34 are driven, the flow of the brake fluid in the direction of the master cylinder 11 is reduced by driving the master cut valves 31 in the state, thereby keeping the hydraulic pressure applied to the wheel cylinders 51 in a pressure increased state.

As described above, when the master cut valves 31 are driven, the current value at the time the master cut valves 31 are driven is calculated by the master cut valve output value calculating unit 78 referring to the map stored in the storage unit 90 of the ECU 70 likewise the time at which the pump motors 34 is driven. That is, when the pump motors 34 are not driven, the current value at the time the master cut valves 31 are driven is calculated based on the pump motor non-drive time control value 102 in the maps stored in the storage unit 90. When the pump motors 34 are not driven, the hydraulic pressure of the brake fluid between the master cut valves 31 and the wheel cylinders 51 can be kept in the state that the hydraulic pressure of the brake fluid is made to a hydraulic pressure by which the necessary braking force can be generated by driving by the master cut valves 31 the current value calculated based on the pump motor non-drive time control value 102.

As described above, when the accelerator pedal 60 is operated in the state that the vehicle stop keeping control is executed, the vehicle stop keeping control is stopped. Specifically, an accelerator opening degree is detected by the accelerator opening degree sensor 61, the result of detection is obtained by the accelerator opening degree obtaining unit 74 provided with the processing unit 71 of the ECU 70, and when the accelerator opening degree obtained by the accelerator opening degree obtaining unit 74 is equal to or larger than a predetermined value, the pump motors 34 and the master cut valves 31 are controlled by the hydraulic pressure controlling unit 79, and the drives of both the pump motors 34 and the master cut valves 31 are stopped. With the operation, since the brake fluid in the hydraulic pressure path 20 on side connected to the wheel cylinders 51 returns in the direction of the master cylinder 11 using the master-cut valves 31 in the hydraulic pressure path 20 as boundaries, the hydraulic pressure applied to the wheel cylinders 51 is reduced and the braking force is not generated.

Figure 4:
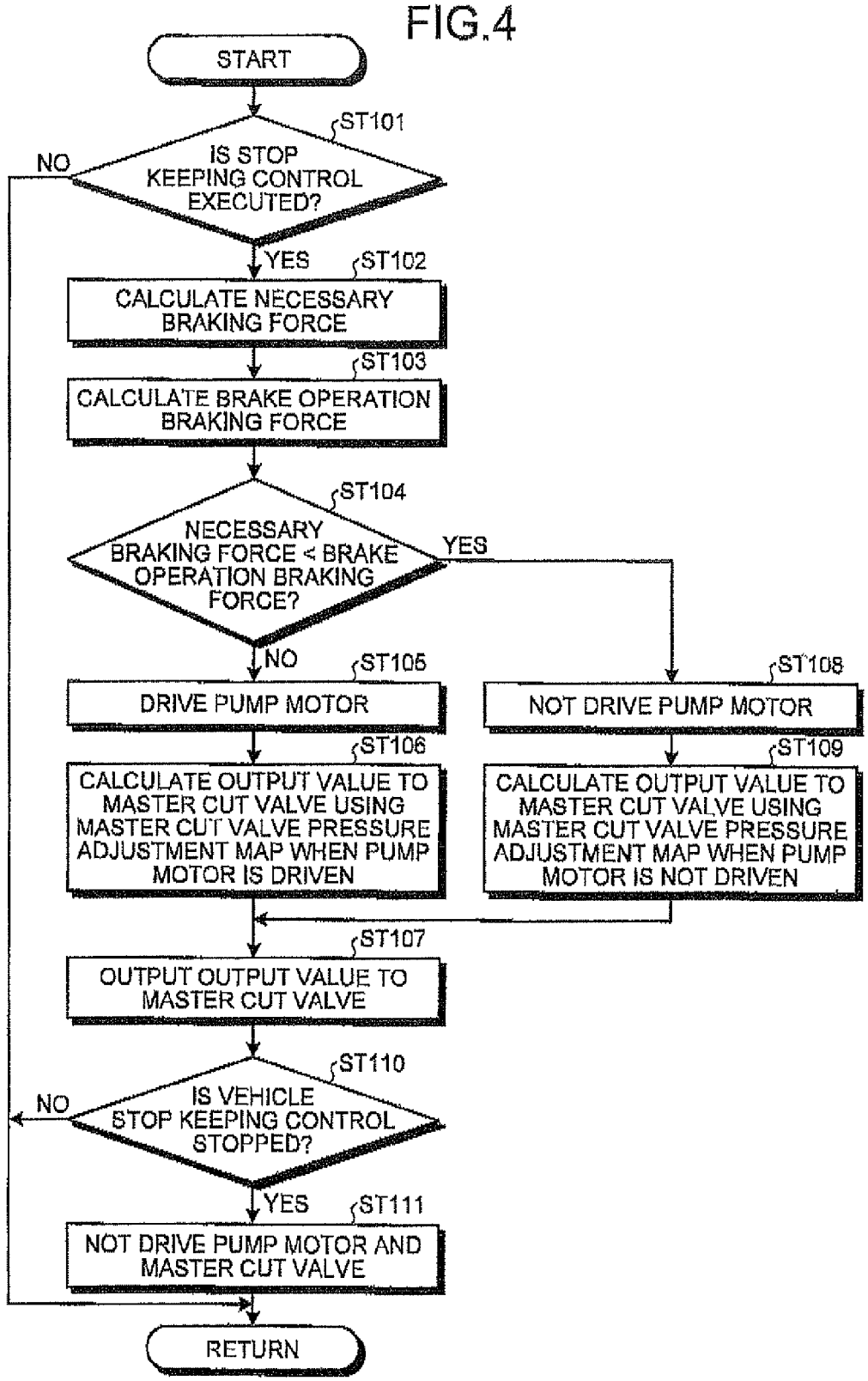
FIG. 4 is a flowchart illustrating a processing procedure of the brake device according to the embodiment.

FIG. 4 is a flowchart illustrating a processing procedure of the brake device according to the embodiment. Next, a control method of the brake device 1 according to the embodiment, that is, the processing procedure of the brake device 1 will be explained. Note that the following processes are a processing procedure when the vehicle stop keeping control is executed and are called in each predetermined period when the respective sections are controlled while the vehicle travels and executed. In the processing procedure of the brake device 1 according to the embodiment, first, whether or not the vehicle stop keeping control is executed is determined (step ST101). The determination is executed by the vehicle stop keeping control determining unit 80 provided with the processing unit 71 of the ECU 70. When whether or not the vehicle stop keeping control is executed is determined by the vehicle stop keeping control determining unit 80, the determination is different depending of the state of a vehicle stop keeping control flag (illustration omitted) which is a flag stored in the storage unit 90 of the ECU 70 and illustrates the state of the vehicle stop keeping control. First, when the vehicle stop keeping control-flag is turned ON, that is, when the vehicle stop keeping control flag illustrates that the vehicle stop keeping control is being executed in a present control state, the vehicle stop keeping control determining unit 80 determines that the vehicle stop keeping control is continuously executed.

Further, when the vehicle stop keeping control flag is turned OFF, that is, when the vehicle, stop keeping control flag illustrates that the vehicle stop keeping control is not being executed in the present control state, first, the vehicle stop keeping control determining unit 80 obtains the state of the control mode switch 65 obtained by the control mode obtaining unit 75, the stroke amount of the brake pedal 5 obtained by the brake stroke amount obtaining unit 72, and the vehicle speed used by the other control while the vehicle travels. In the state of the control mode switch 65, when the vehicle stop keeping control is in the ON state, the stroke amount of the brake pedal 5 is equal to or larger than the predetermined stroke amount as well as the vehicle speed is equal to or slower than a predetermined vehicle speed, since the condition for executing the vehicle stop keeping control is established in the state, the vehicle stop keeping control determining unit 80 which has obtained the above data determines that the vehicle stop keeping control is executed. Further, when the vehicle stop keeping control determining unit 80 determines that the vehicle stop keeping control is executed as described above, the vehicle stop keeping control flag is turned ON.

In contrast, when the vehicle stop keeping control flag is turned off and further when the state of the control mode switch 65 is in an OFF state, or when the stroke amount of the brake pedal 5 is lower than the predetermined stroke amount, or when the vehicle speed is faster than the predetermined vehicle speed, since the condition for executing the vehicle stop keeping control is not established, the vehicle stop keeping control determining unit 80 determines that the vehicle stop keeping control is not executed. When the vehicle stop keeping control determining unit 80 determines that the vehicle stop keeping control is not executed, the processing procedure is exited. Note that the predetermined stroke amount of the brake pedal 5, which is used to determine whether or not the condition for executing the vehicle stop keeping control is established, is previously set as a stroke amount by which it can be determined that the driver has an intension for stopping the vehicle and stored in the storage unit 90 of the ECU 70. Further, the predetermined vehicle speed, which is used to determine whether or not the condition for executing the vehicle stop keeping control is established, is previously set as a vehicle speed by which it can be determined that the vehicle approximately stops and stored in the storage unit 90 of the ECU 70.

When it is determined to execute the vehicle stop keeping control by the determination (step ST101) in the vehicle stop keeping control determining unit 80, next, the necessary braking force is calculated (step ST102). The calculation is executed by the necessary braking force calculating unit 76 provided With the processing unit 71 of the ECU 70. When the necessary braking force is calculated by the necessary braking force calculating unit 76, first, a force for moving the vehicle is calculated by measuring the gradient of a slope road on which the vehicle stops from a result of detection of a G sensor (illustration omitted) which detects an acceleration used in the other control of the vehicle, obtaining the number of revolutions of idling of the engine used in the other control of the vehicle, and calculating a drive force in a creep travel based on the obtained number of revolutions of idling. After the force for moving the vehicle is calculated as described above, the necessary braking force calculating unit 76 calculates the necessary braking force which is a force necessary to keep the stop of the vehicle which tends to move by being applied with the force. Note that, when the braking force is generated by the brake device 1, the braking force may be dispersed due to dispersion of the brake device 1 when it is manufactured. Thus, when the necessary braking force is calculated by the necessary braking force calculating unit 76, the necessary braking force is calculated to a little large value to compensate the dispersion.

Next, the brake operation braking force is calculated (step ST103). The calculation is executed by the brake operation braking force calculating unit 77 provided with the processing unit 71 of the ECU 70. When the brake operation braking force is calculated by the brake operation braking force calculating unit 77, first, the hydraulic pressure, which is generated in the hydraulic pressure path 20 by that the driver operates the brake pedal 5, is obtained by obtaining the master cylinder pressure, which is obtained by the master cylinder pressure obtaining unit 73, by the brake operation braking force calculating unit 77. Further, the braking force, which is generated by applying the hydraulic pressure to the wheel cylinders 51, is calculated by the brake operation braking force calculating unit 77. As a result, the brake operation braking force, which is the braking force generated by that the driver applies the depression force to the brake pedal 5, is calculated by the brake operation braking force calculating unit 77.

Next, whether or not (necessary braking force<brake operation braking force) is established is determined (step ST104). The determination is executed by the braking force determining unit 81 provided with the processing unit 71 of the ECU 70. The braking force determining unit 81 compares the necessary braking force calculated by the necessary braking force calculating unit 76 with the brake operation braking force calculated by the brake operation braking force calculating unit 77 and determines whether or not the necessary braking force is smaller than the brake operation braking force.

When it is determined by the determination in the braking force determining unit 81 (step ST104) that (necessary braking force<brake operation braking force) is not established, that is, when it is determined that the necessary braking force is equal to or larger than the brake operation braking force, the pump motors 34 are driven (step ST105). The drive is executed by the hydraulic pressure controlling unit 79 provided with the processing unit 71 of the ECU 70. The hydraulic pressure controlling unit 79 transmits a control signal for driving the pump motors 34 to the pump motors 34. In response to the control signal, the pump motors 34 are driven. When the pump motors 34 are driven, the pump motors 34 pressurizes the brake fluid in the hydraulic pressure path 20 and increases the hydraulic pressure of the brake fluid. With the operation, the hydraulic pressure of the brake fluid in the hydraulic pressure path 20 is made to a hydraulic pressure which is equal to or larger than the hydraulic pressure by which the necessary braking force can be generated by the wheel cylinders 51 regardless the brake operation state to the brake pedal 5.

Next, the output value to the master cut valves 31 is calculated using the master cut valve pressure adjustment map at the time the pump motors 34 are driven (step ST106). The calculation is executed by the master cut valve output value calculating unit 78 provided with the processing unit 71 of the ECU 70. When the output value to the master cut valves 31 is calculated by the master cut valve output value calculating unit 78, the output value is calculated based on the master cut valve pressure adjustment map (refer to FIG. 3) which is stored in the storage unit 90 of the ECU 70 and is a map illustrating the relation between the pressure adjustment value and the current value when the brake fluid pressure is adjusted by driving by the master cut valves 31 by flowing a current to the master cut valves 31.

At the time the calculation is executed, when it is determined by the determination of the braking force determining unit 81 (step ST104) that (necessary braking force<brake operation braking force) is not established and the pump motors 34 are driven (step ST105), the master cut valve output value calculating unit 78 calculates the output value based on the pump motor drive time control value 101 in the master cut valve pressure adjustment maps stored in the storage unit 90. Specifically, the pressure adjustment value, by which the necessary braking force calculated by the necessary braking force calculating unit 76 can be obtained, is applied to the pump motor drive time control value 101 by the master cut valve output value calculating unit 78, and a current value, which is flown to the master cut valves 31, is obtained using the pump motor drive time control value 101 illustrating the relation between the pressure adjustment value and the current value. With the operation, the master cut valve output value calculating unit 78 calculates the current value as the output value to the master cut valves 31 when the pump motors 34 are driven.

Next, the output value is output to the master cut valves 31 (step ST107). The output is executed by the hydraulic pressure controlling unit 79 provided with the processing unit 71 of the ECU 70. The hydraulic pressure controlling unit 79 outputs the output value calculated by the master cut valve output value calculating unit 78 by the master cut valves 31. The output value acts as a control signal for driving the normally-open master cut valves 31 in a close direction in a control amount suitable when the pump motors 34 are driven. With the operation, the master cut valves 31 are driven in the close direction. When the master cut valves 31 are driven in the close direction, the brake fluid in the hydraulic pressure path 20 becomes unlikely to flow in the direction of the master cylinder 11 from the hold valves 32 side. Although the hydraulic pressure in the hydraulic pressure path 20 is increased by driving the pump motors 34, the brake fluid in the hydraulic pressure path 20 becomes unlikely to flow in the direction of the master cylinder 11 from the hold valves 32 side. Accordingly, even when the driver removes the depression force to the brake pedal 5, the hydraulic pressure in the path positioned between the master cut valves 31 and the wheel cylinders 51 in the hydraulic pressure path 20 is kept.

Further, at the time, to control by the master cut valves 31 by the output value calculated by the master cut valve output value calculating unit 78 based on the pump motor drive time control value 101, the hydraulic pressure controlling unit 79 adjusts the degree of opening of the master cut valves 31 so that the hydraulic pressure, which is applied to the wheel cylinders 51 in the state that the pump motors 34 is driven, becomes a hydraulic pressure having a magnitude by which the braking force generated in the wheel cylinders 51 becomes the necessary braking force. With the operation, since the hydraulic pressure, which can generate the necessary braking force, is continuously applied to the wheel cylinders 51, the wheel cylinders 51 continuously generates the necessary braking force.

In contrast, when it is determined by the determination of the braking force determining unit 81 (step ST104) that (necessary braking force<brake operation braking force) is established, the pump motors 34 are placed in the non-drive state (step ST108). That is, the pump motors 34 are placed in the non-drive state by transmitting a non-drive control signal to the pump motors 34 controlled by the hydraulic pressure controlling unit 79 or by not transmitting a control signal for driving the pump motors 34. When the pump motors 34 are placed in the non-drive state, the pump motors 34 do not pressurize the brake fluid in the hydraulic pressure path 20. As a result, the hydraulic pressure generated by the brake operation of the driver is applied to the wheel cylinders 51, and the wheel cylinders 51 generate the brake operation braking force by the hydraulic pressure. With the operation, the hydraulic pressure, which is generated by the brake operation of the driver, is applied to the wheel cylinders 51, and the wheel cylinders 51 generates the brake operation braking force by the hydraulic pressure. The wheel cylinders 51, which generates the brake operation braking force, causes the brake operation braking force to keep the rotation stop state of the brake discs 55 and causes the brake operation braking force to keep the stop state of the vehicle.

Next, the output value to the master cut valves 31 is calculated using the master cut valve pressure adjustment map when the pump motors 34 are placed in the non-drive state (step ST109). The calculation is executed using the master cut valve output value calculating unit 78 provided with the processing unit 71 of the ECU 70. When the output value to the master cut valves 31 is calculated by the master cut valve output value calculating unit 78, the output value is calculated based on the master cut valve pressure adjustment map (refer to FIG. 3) stored in the storage unit 90 of the ECU 70 likewise the case that the output value to the master cut valves 31 is calculated using the master cut valve pressure adjustment map at the time the pump motors 34 are driven (step ST106).

In the execution of the calculation, when it is determined by the determination of the braking force determining unit 81 (step ST104) that (necessary braking force<brake operation braking force) is established and the pump motors 34 are placed in the non-drive state (step ST108), the master cut valve output value calculating unit 78 executes the calculation based on the pump motor non-drive time control value 102 in the master cut valve pressure adjustment maps stored in the storage unit 90. Specifically, the pressure adjustment value, by which the necessary braking force calculated by the necessary braking force calculating unit 76 can be obtained, is applied to the pump motor non-drive time control value 102 by the master cut valve output value calculating unit 78, and a current value, which is flown to the master cut valves 31, is obtained using the pump motor non-drive time control value 102 illustrating the relation between the pressure adjustment value and the current value. With the operation, the master cut valve output value calculating unit 78 calculates the current value as the output value to the master cut valves 31 when the pump motors 34 are not driven.

Next, the output value calculated by the master cut valve output value calculating unit 78 is output to the master cut valves 31 by the hydraulic pressure controlling unit 79 (step ST107) likewise the state that the pump motors 34 are driven (step ST105). The output value acts as a control signal for driving the normally-open master cut valves 31 in the close direction in a control amount suitable when the pump motors 34 are not driven. With the operation, the master cut valves 31 are driven in the close direction in the control amount suitable when the pump motors 34 are not driven.

Specifically, when the pump motors 34 are not driven, since the hydraulic pressure of the brake fluid in the hydraulic pressure path 20 tends to be more reduced than when the pump motors 34 are driven. Accordingly, when the pump motors 34 are not driven, it is necessary, at the time a desired pressure adjustment value is obtained, to reduce the flow of the brake fluid in the direction of the master cylinder 11 from the wheel cylinders 51 side by causing the master cut valves 31 to tend to be closed in comparison with the time at which the pump motors 34 are driven and to secure the hydraulic pressure applied to the wheel cylinders 51. Therefore, the master cut valves 31 are driven in a tendency in which it is more closed than the time at which the pump motors 34 are driven by outputting the output value, which is calculated by the master cut valve output value calculating unit 78 and suitable for the time at which the pump motors 34 are not driven, to the master cut valves 31. With the operation, the brake fluid in the hydraulic pressure path 20 becomes unlikely to flow from the hold valves 32 side in the direction of the master cylinder 11, and even when the driver removes the depression force to the brake pedal 5, the hydraulic pressure in the path positioned between the master cut valves 31 and the wheel cylinders 51 in the hydraulic pressure path 20 is kept.

Further, at the time, to control the master cut valves 31 by the master cut valve output value calculating unit 76 by the output value calculated based on the pump motor non-drive time, control value 102, the hydraulic pressure controlling unit 79 adjusts the degree of opening of the master cut valves 31 so that the hydraulic pressure, which is applied to the wheel cylinders 51 in the state that the pump motors 34 are not driven, becomes the hydraulic pressure having the magnitude by which the braking force generated in the wheel cylinders 51 becomes the necessary braking force. With the operation, since the hydraulic pressure, which can generate the necessary braking force, is continuously applied to the wheel cylinders 51, the wheel cylinders 51 continuously generate the necessary braking force.

As described above, at the time the vehicle stop keeping control is performed, when the necessary braking force, which is the braking force necessary to continuously keep the stop of the vehicle, is smaller than the brake operation braking force, which is the braking force generated in the wheel cylinders 51 based on the brake operation of the driver, the hydraulic pressure controlling unit 79 reduces the flow of the brake fluid in the direction of the master cylinder 11 by the master cut valves 31 without increasing the hydraulic pressure by the pump motors 34, thereby executing the vehicle stop keeping control by keeping the hydraulic pressure by which the wheel cylinders 51 can generate the brake operation braking force. That is, when the necessary braking force is equal to or larger than the brake operation braking force, the hydraulic pressure controlling unit 79 executes the vehicle stop keeping control by driving both the pump motors 34 and the master cut valves 31, whereas when the necessary braking force is smaller than the brake operation braking force, the hydraulic pressure controlling unit 79 executes the vehicle stop keeping control by driving only the master cut valves 31 without driving the pump motors 34.

As described above, when the flow of the brake fluid in the direction of the master cylinder 11 is reduced by the master cut valves 31, the hydraulic pressure controlling unit 79 makes the degree of reduction different in the case that the hydraulic pressure of the brake fluid is increased by the pump motors 34 by driving the pump motors 34 and in the case that the hydraulic pressure of the brake fluid is not increased by the pump motors 34 by not driving the pump motors 34 by outputting the output value calculated by the master cut valve output value calculating unit 78 to the master cut valves 31. That is, when the hydraulic pressure of the brake fluid is not increased by the pump motors 34, the hydraulic pressure controlling unit 79 more increases the degree, of reduction of the hydraulic pressure of the brake fluid when the flow of the brake fluid in the direction of the master cylinder 11 is reduced by the master cut valves 31 than when the hydraulic pressure of the brake fluid is increased by the pump motors 34, thereby keeping the hydraulic pressure by which the wheel cylinders 51 can generate the necessary braking force.

When the output value calculated by the master cut valve output value calculating unit 78 is output to the master cut valves 31 by the hydraulic pressure controlling unit 79 (step ST107), next, whether or not the vehicle stop keeping control is stopped is determined (step ST110). The determination is executed by the vehicle stop keeping control determining unit 80 likewise the determination whether or not the vehicle stop keeping control is executed (step ST101). The vehicle stop keeping control determining unit 80 obtains the accelerator opening degree obtained by the accelerator opening degree obtaining unit 74, and, when the accelerator opening degree is equal to or larger than a predetermined accelerator opening degree, the vehicle stop keeping control determining unit 80 determines to stop the vehicle stop keeping control. When it is determined by the determination by the vehicle stop keeping control determining unit 80 that the vehicle stop keeping control is not stopped, the processing procedure is exited. Note that the predetermined accelerator opening degree used when it is determined whether or not the vehicle stop keeping control is stopped is previously set as an accelerator opening degree by which it can be determined that the driver has an intention for starting the vehicle and stored in the storage unit 90 of the ECU 70.

In contrast, when it is determined by the determination in the vehicle stop keeping control determining unit 80 (step ST110) that the vehicle stop keeping control is stopped the pump motors 34 and the master cut valves 31 are not driven (step ST111). That is, a control signal for placing both the pump motors 34 and the master cut valves 31 in the non-drive state is transmitted from the hydraulic pressure controlling unit 79, which controls the pump motors 34 and the master cut valves 31, to the pump motors 34 and the master cut valves 31, or a control signal for driving the pump motors 34 and the master cut valves 31 is not transmitted. With the operation, both the pump motors 34 and the master cut valves 31 are placed in the non-drive state together. As described above, when the pump motors 34 and the master cut valves 31 are placed in the non-drive state, the pump motors 34 stop pressurizing the brake fluid in the hydraulic pressure path 20.

Further, when the master cut valves 31 are placed in the non-drive state, since the master cut valves 31 are normally-open solenoid valves, the master cut valves 31 remain opened. As a result, the hydraulic pressure in the hydraulic pressure path 20 changes in response to the depression force input to the brake pedal 5, and the braking force changes in response to the depression force. Further, when the vehicle stop keeping control is stopped by placing the pump motors 34 and the master cut valves 31 in the non-drive state, the vehicle stop keeping control flag is turned OFF, thereby illustrating that the vehicle stop keeping control is stopped. After the pump motors 34 and the master cut valves 31 are placed in the non-drive state as described above, the processing procedure is exited.

At the time the necessary braking force is generated to the wheel cylinders 51, when the necessary braking force is equal to or larger than the brake operation braking force, the brake device 1 drives the pump motors 34, whereas when the necessary braking force is smaller than the brake operation braking force, the brake device 1 keeps the hydraulic pressure by which the wheel cylinders 51 can generate the necessary braking force in the state that the pump motors 34 are placed in the non-drive state. As described above, when the necessary braking force is smaller than the brake operation braking force, since the hydraulic pressure by which the wheel cylinders 51 can generate the necessary braking force can be secured only by the brake operation without increasing the hydraulic pressure by the pump motors 34, the drive time of the pump motors 34 can be reduced while securing the necessary braking force by placing the pump motors 34 in the non-drive state in the case. As a result, the durability of the pump motors 34 used to control the braking force can be secured.

Further, when the flow of the brake fluid in the direction of the master cylinder 11 is adjusted by the master cut valves 31, the degree of adjustment of the flow is made different between when the pump motors 34 are driven and when the pump motors 34 are not driven. Since the hydraulic pressure applied to the wheel cylinders 51 is liable to be made different between when the pump motors 34 are driven and when the pump motors 34 are not driven, the hydraulic pressure applied to the wheel cylinders 51 can be made to a desired hydraulic pressure in both the states when the pump motors 34 are driven and when the pump motors 34 are not driven at the time the necessary braking force is generated by making the degree, by which the flow of the brake fluid in the direction of the master cylinder 11 from the wheel cylinders 51 side is adjusted by the master cut valves 31 different between when the pump motors 34 are driven and when the pump motors 34 not driven. As a result, when the braking force is generated by the wheel cylinders 51, the durability of the pump motors 34 can be secured while more reliably securing the braking force equal to or larger than the necessary braking force.

Further, when the flow of the brake fluid in the direction of the master cylinder 11 is adjusted by the master out valves 31, the flow of the brake fluid in the direction of the master cylinder 11 is more reduced when the pump motors 34 are not driven than when the pump motors 34 are driven. Since the hydraulic pressure applied to the wheel cylinders 51 is liable to be more reduced when the pump motors 34 are not driven than when the pump motors 34 are driven, the hydraulic pressures applied to the wheel cylinders 51 can be easily kept when the necessary braking force is generated by more reducing the flow of the brake fluid in the direction of the master cylinder 11 from the wheel cylinders 51 side is by the master cut valves 31 when the pump motors 34 are not driven than when the pump motors 34 are driven. That is, when the pump motors 34 are not driven, the hydraulic pressure, which is applied to the wheel cylinders 51 when the pump motors 34 are not driven, can be more reliably made to the desired hydraulic pressure by making the brake fluid unlike to flow in the direction of the master cylinder 11 from the wheel cylinders 51 side. As a result, when the braking force is exerted in the wheel cylinders 51, the durability of the pump motors 34 can be secured while more reliably securing the braking force equal to or larger than the necessary braking force.

Further, since the degree of adjustment of the flow of the brake fluid in the direction of the master cylinder 11 is made different in response to the drive state of the pump motors 34 by calculating the output value to the master cut valves 31 when the master cut valves 31 are controlled by the master cut valve output value calculating unit 78 in response to the drive state of the pump motors 34 and outputting the output value to the master cut valves 31, the hydraulic pressure of the brake fluid in the vehicle stop keeping control can be more reliably made to the desired hydraulic pressure. That is, since the master cut valves 31 are driven by the output value calculated in response to the drive state of the pump motors 34, the degree of adjustment of the flow of the brake fluid in the direction of the master cylinder 11 can be more reliably made suitable for the drive state of the pump motors 34. As a result, when the braking force is generated by the wheel cylinders 51, the durability of the pump motors 34 can be secured while more reliably securing the braking force equal to or larger than the necessary braking force.

Further, when the master cut valve pressure adjustment map at the time the pump motors 34 are driven and the master cut valve pressure adjustment map at the time the pump motors 34 are not driven are previously set and the output value to the master cut valves 31 is calculated, since the output value is calculated by switching the maps in response to the drive state of the pump motors 34, the accuracy when the output values of the master cut valves 31 are calculated can be improved. Specifically, the pump motor non-drive time control value 102, which is the master cut valve pressure adjustment map when the pump motors 34 are not driven is set independently of the pump motor drive time control value 101 which is the master cut valve pressure adjustment map when the pump motors 34 are driven, and when the pump motors 34 are not driven, the output value to the master cut valves 31 is calculated using the pump motor non-drive time control value 102. Accordingly, the output value to the master cut valves 31 when the pump motors 34 are not driven can be accurately calculated. With the operation, when the necessary braking force is generated, the hydraulic pressure, which is applied to the wheel cylinders 51 at the time the pump motors 34 are not driven, can be more reliably made to the desired hydraulic pressure, and thus the necessary braking force can be generated. As a result, when the braking force is generated by the wheel cylinders 51, the durability of the pump motors 34 can be secured while more reliably securing the braking force equal to or larger than the necessary braking force.

Further, when the pump motors 34 are driven while the brake pedal 5 is being operated for braking, the driver may have a feeling as if the brake pedal 5 is drawn in because the pressure to the brake pedal 5 is reduced. However, when the vehicle stop keeping control is executed by operating the brake pedal 5 for braking by switching the drive and the non-drive of the pump motors 34, a state that the pump motors 34 are not driven can be provided. With the operation, the uncomfortable feeling as if the brake pedal 5 is drawn in, which is generated in the brake operation, can be reduced. As a result, the durability of the pump motors 34 can be secured as well as the uncomfortable feeling in the vehicle stop keeping control can be suppressed.

Further, when the necessary braking force is smaller than the brake operation braking force at the time the necessary braking force is generated, that is, when the braking force necessary to keep the stop of the vehicle can be secured by the brake operation braking force, since the pump motors 34 are placed in the non-drive state without increasing the hydraulic pressure by the pump motors 34, the amount of consumption of electricity used to drive the pump motor 34 can be reduced. As a result, the amount of consumption of electricity when the necessary braking force is generated can be reduced.

Further, since the drive time of the pump motors 34 when the necessary braking force is generated can be reduced, the time of operation noise generated when the pump motors 34 are driven can be reduced. As a result, the quietness in the vehicle stop keeping control when the necessary braking force is generated can be improved.

Further, the necessary braking force becomes the braking force which is necessary to keep the stop of the vehicle when the vehicle stop keeping control, which is a control for continuously generating the braking force to the wheel cylinders 51, is executed by reducing the flow of the brake fluid in the direction of the master cylinder 11 by the master cut valves 31 even in the state that in which the brake operation to the brake pedal 5 is not executed. Further, the necessary braking force becomes a braking force used to determine whether the pump motors 34 are driven or not driven by comparing the relative magnitude of the necessary braking force with the relative magnitude of the brake operation braking force. Therefore, when the necessary braking force is generated in the vehicle stop keeping control, since the pump motors 34 are not driven all times and thus the operation time of the pump motors 34 is reduced, a load of the pump motors 34 can be reduced. As a result, the durability of the pump motors 34 can be secured while more reliably keeping the vehicle stop state in the vehicle stop keeping control.

Further, the relative magnitude of the necessary braking force is compared with the relative magnitude of the brake operation braking force in a control flow of the vehicle stop keeping control (step ST104). Accordingly, when it is determined that the necessary braking force is smaller than the brake operation braking force at the time the driver increases the amount of depression of the brake pedal 5 in the state that the pump motors 34 are driven by the determination of the braking force determining unit 81 that the necessary braking force is equal to or larger than the brake operation braking force in the vehicle stop keeping control, the pump motors 34 can be placed in the non-operation state. That is, even after the pump motors 34 are placed in the drive state once in the vehicle stop keeping control, since the relative magnitude of the necessary braking force is continuously compared with the relative magnitude of the brake operation braking force in the vehicle stop keeping control, the time, in which the pump motors 34 are placed in the non-drive state, can be more reliably increased and thus the operation time of the pump motors 34 can be more reliably reduced. Further, with the operation, the uncomfortable feeling, which is caused by the brake operation when the pump motors 34 are driven, can be reduced, the time in which operation noise is generated by the pump motors 34 can be reduced, and the amount of consumption of electricity can be reduced. As a result, the durability of the pump motors 34 can be more reliably secured as well as the uncomfortable feeling in the vehicle stop keeping control can be suppressed, and further quietness in the vehicle stop keeping control can be improved, and the amount of consumption of electricity can be reduced.

Further, in the vehicle stop keeping control, since the master cut valves 31 and the pump motors 34 are driven in response to the necessary braking force, a trouble when the vehicle stop keeping control is stopped and the vehicle is started can be suppressed. That is, the hydraulic pressure applied to the wheel cylinders 51 is reduced to reduce the braking force, a higher hydraulic pressure applied to the wheel cylinders 51 requires a longer time to reduce the hydraulic pressure. Therefore, in the vehicle stop keeping control, the master cut valves 31 and the pump motors 34 are driven in response to the necessary braking force and a hydraulic pressure suitable for the necessary braking force is applied to the wheel cylinders 51, thereby the time, when the hydraulic pressure applied to the wheel cylinders 51 is reduced at the time the vehicle stop keeping control is stopped, can be suppressed from becoming excessively long. With the operation, when the vehicle stop keeping control is stopped and the vehicle is started, the braking force can be reduced in a short time. As a result, a trouble in start when the vehicle stop keeping control is stopped and the vehicle is started can be suppressed.

Figure 5:
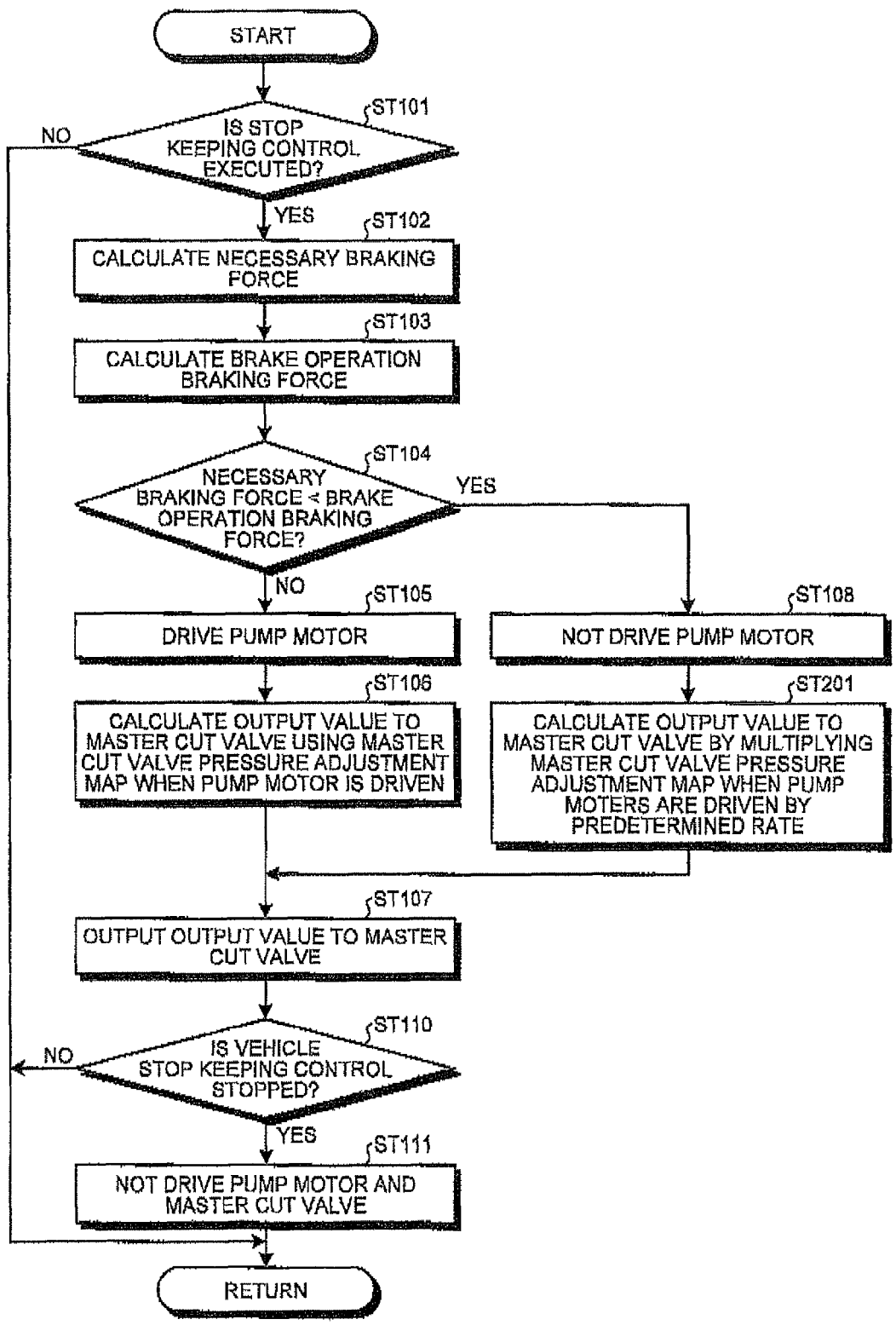
FIG. 5 is a flowchart illustrating a processing procedure of a brake device according to a modification.
Figure 6:
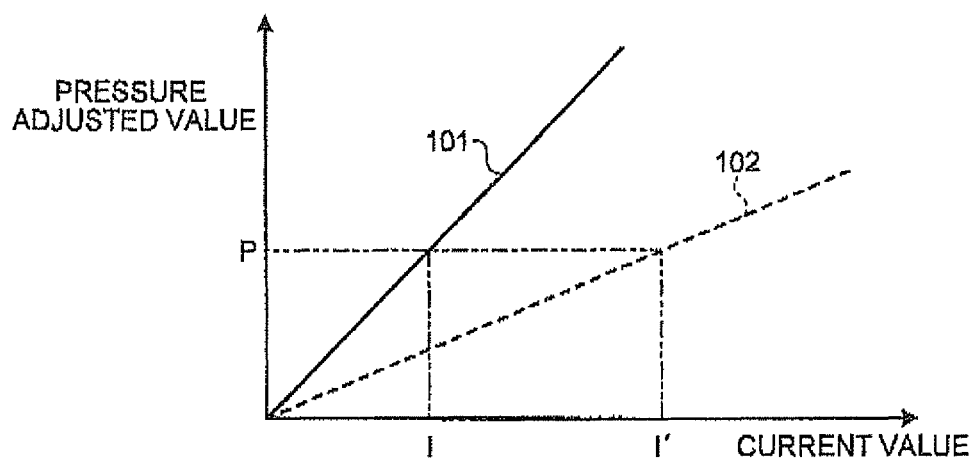
FIG. 6 is an explanatory view illustrating of a master cut valve pressure adjustment map of the brake device according to the modification.

FIG. 5 is a flowchart illustrating a processing procedure of a brake device according to a modification, FIG. 6 is an explanatory view illustrating a master cut valve pressure adjustment map of the brake device according to the modification. Note that in the brake device 1 according to the embodiment, although two types of master cut valve pressure adjustment maps, which are a map when the pump motors 34 are driven and a map when the pump motors 34 are not driven, are previously set, the master cut valve pressure adjustment maps may not be set in the two types. For example, only a pump motor drive time control value 101, which is a map when the pump motors 34 are driven may be set as a pressure adjustment map and stored in a storage unit 90 of an ECU 70, and, an output value to the master cut valves 31 may be calculated using the pump motor drive time control value 101 also when the pump motors 34 are not driven.

In the case, as illustrated in FIG. 5, when it is determined by a vehicle stop keeping control determining unit 80 a vehicle stop keeping control is executed and it is determined by the braking force determining unit 81 that a necessary braking force is equal to or larger than a brake operation braking force, the pump motors 34 are driven by controlling the pump motors 34 by a hydraulic pressure controlling unit 79 (step ST105). As described above, when the pump motors 34 are driven, an output value to the master cut valves 31 is calculated by a master cut valve output value calculating unit 78 using the pump motor drive time control value 101 used as the master cut valve pressure adjustment map when the pump motors are driven (step ST106). When, for example, a pressure adjustment value P is obtained, as illustrated in FIG. 6, the pressure adjustment value P is applied to the pump motor drive time control value 101, and a current value I, by which the pressure adjustment value P can be obtained, is obtained. The master cut valve output value calculating unit 78 calculates the current value I as the output value to the master cut valves 31.

After the output value to the master cut valves 31 when the pump motors 34 are driven is calculated, the output value is output to the master cut valves 31 by the hydraulic pressure controlling unit 79 (step ST107). With the operation, the vehicle stop keeping control is executed by driving the master cut valves 31 and keeping the hydraulic pressure applied to the wheel cylinders 51.

In contrast, when it is determined by a vehicle stop keeping control determining unit 80 that the vehicle stop keeping control is executed and it is determined by a braking force determining unit 81 that (necessary braking force<brake operation braking force) is established, the pump motors 34 are placed in a non-driven state (step ST108). As described above, when the pump motors 34 are placed in the non-driven state, the output value to the master cut valves 31 is calculated by the master cut valve output value calculating unit 78 by multiplying the master cut valve pressure adjustment map when the pump motors are driven by a predetermined rate (step ST201). That is, when the pressure adjustment value P is obtained when the pump motors 34 are not driven, as illustrated in FIG. 6, first, the pressure adjustment value P is applied to the pump motor drive time control value 101, and the current value I, by which the pressure adjustment value P can be obtained, is obtained. Further, a current value I' is calculated by multiplying the current value I by a predetermined rate. The current value I' becomes a current value approximately as large as the current value when a current value, by which a pressure adjustment value P can be obtained, is calculated, using the pump motor non-drive time control value 102 set by the brake device 1 according to the embodiment. When the pump motors 34 are not driven, the current value I', which is the output value to the master cut valves 31, is calculated by multiplying the current value obtained using the pump motor drive time control value 101 by the predetermined coefficient as described above.

After the output value to the master cut valves 31 when the pump motors 34 are not driven is calculated, the output value is output to the master cut valves 31 by the hydraulic pressure controlling unit 79 (step ST107). With the operation, the vehicle stop keeping control is executed by driving the master cut valves 31 and keeping the hydraulic pressure applied to the wheel cylinders 51.

As described above, when the master cut valve pressure adjustment map is set only as the map at the time the pump motors 34 are driven and the output value to the master cut valves 31 is calculated by multiplying the master cut valve pressure adjustment map by the predetermined rate at the time the pump motors 34 are not driven, the output value of the master cut valves 31 can be accurately calculated regardless the drive state of the master cut valves 31. With the operation, an increase of the capacity of the storage unit 90 for storing the master cut valve pressure adjustment map can be suppressed while improving the accuracy when the output value of the master cut valves 31 is calculated. As a result, an increase of the manufacture cost when the durability of the pump motors 34 is secured can be suppressed as well as the braking force when the necessary braking force is generated by the wheel cylinders 51 can be reliably controlled.

Note that, in the modification, although the master cut valve pressure adjustment map is set only as the map when the pump motors 34 are driven and, when the pump motors 34 are not driven, the output value to the master cut valves 31 is calculated by multiplying the master cut valve pressure adjustment map by the predetermined rate, this may be vice versa. That is, the master cut valve pressure adjustment map may be set only as a map when the pump motors 34 are not driven and, when the pump motors 34 are driven, the output value to the master cut valves 31 may be calculated by multiplying the master cut valve pressure adjustment map by the predetermined rate.

Further, when the brake operation braking force is calculated (step ST103), the brake device 1 described above obtains the master cylinder pressure, which is detected by the master cylinder pressure sensor 39, by the master cylinder pressure obtaining unit 73 and calculates the brake operation braking force by the brake operation braking force calculating unit 77 based on the obtained the master cylinder pressure. However, the brake operation braking force may be calculated based on a subject other than the master cylinder pressure. For example, the stroke amount of a brake pedal 5 obtained by the brake stroke amount obtaining unit 72 may be obtained by the brake operation braking force calculating unit 77, and the brake operation braking force may be calculated by the brake operation braking force calculating unit 77 based on the obtained stroke amount. Further, a detection means such as a sensor and the like which can directly detect the hydraulic pressure applied to the wheel cylinders 51 may be provided, and the brake operation braking force may be calculated by the brake operation braking force calculating unit 77 based on the hydraulic pressure detected by the sensor. As described above, the subject to be detected when the brake operation braking force is calculated by the brake operation braking force calculating unit 77 may be a subject other than the master cylinder pressure as long as the subject can be changed by the brake operation of the driver, and the brake operation braking force can be calculated based on the changed value, and the brake operation braking force calculating unit 77 may be disposed to calculate the brake operation braking force based on the subject other than the master cylinder pressure.

Further, in the brake device 1 described above, although whether or not the vehicle stop keeping control is executed in the brake operation is switched by the control mode switch 65, the switching may be executed by a device other than the control mode switch 65. Whether or not the vehicle stop keeping control is executed may be switched by a device other than the control mode switch 65 as long as the device can properly switch the ordinary brake control and the vehicle stop keeping control.

Further, in the brake device 1, although the necessary braking force is the braking force necessary to keep the stop of the vehicle when the vehicle stop keeping control is executed, the necessary braking force may be a braking force other than the above braking force. The necessary braking force is a braking force which is necessary to braking acting as a target of the vehicle when, for example, the braking forces generated by the respective wheels are independently controlled for the purpose of stabilizing the travel of the vehicle, and the like and the braking force may be a braking force other than the braking force used when the vehicle stop keeping control is executed as long as the braking force has a chance of being generated using the brake operation of the driver and the drive of the pump motors 34 together. That is, the brake device according to the present invention may be applied to a brake device other than brake device for executing the vehicle stop keeping control.

INDUSTRIAL APPLICABILITY

As described above, the brake device according to the present invention is useful for a brake device including master cut valves and pump motors and particularly suitable for a brake device for executing a vehicle stop keeping control.

The invention claimed is:

1. A brake device comprising:
a brake operating unit that is a section for executing a brake operation as an operation when a vehicle is braked;
a fluid pressure generating unit connected to the brake operating unit as well as capable of increasing a fluid pressure of an operating fluid in response to the brake operation to the brake operating unit;
a braking force generating unit connected to an operating fluid path connected to the fluid pressure generating unit as well as generating a braking force by being operated by a fluid pressure of the operating fluid;
a flow rate adjusting unit capable of adjusting a flow of the operating fluid in the direction from the braking force generating unit side to the fluid pressure generating unit;
a pressure increasing unit capable of increasing a fluid pressure of the operating fluid equal to or larger than a fluid pressure generated by the fluid pressure generating unit; and
a fluid pressure controlling unit disposed to control a fluid pressure of the operating fluid by controlling the flow rate adjusting unit and the pressure increasing unit, that adjusts, when a necessary braking force, which is the braking force necessary to a braking acting as a target of the vehicle is equal to or larger than a brake operation braking force acting as the braking force generated by the braking force generating unit by the brake operation, a flow of the operating fluid in the direction of the fluid pressure generating unit by the flow rate adjusting unit in a state that the fluid pressure is increased by the pressure increasing unit, and that keeps the fluid pressure by which the braking force generating unit can generate the necessary braking force by adjusting the flow of the operating fluid in the direction of the fluid pressure generating unit by the flow rate adjusting unit without causing the pressure increasing unit to increase the fluid pressure when the necessary braking force is smaller than the brake operation braking force as well as by more reducing the flow of the operating fluid in the direction of the fluid pressure generating unit than when the fluid pressure is increased by the pressure increasing unit.

2. The brake device according to claim 1, further comprising:
a flow rate adjusting unit-output value calculate unit capable of calculating an output value to the flow rate adjusting unit when the flow rate adjusting unit is controlled in response to the state of increase of the fluid pressure in the pressure increasing unit, wherein
the fluid pressure controlling unit makes the degree of adjustment, at the time the flow rate adjusting unit adjusts the flow of the operating fluid in the direction of the fluid pressure generating unit, different between when the pressure increasing unit increases the fluid pressure and when the pressure increasing unit does not increase the fluid pressure by outputting the output value calculated by the flow rate adjusting unit-output value calculating unit to the flow rate adjusting unit.

3. The brake device according to claim 1, wherein the necessary braking force is a braking force necessary to keep the stop of the vehicle at the time of the vehicle stop keeping control that is a control for continuously keeping the stop of the vehicle by causing the braking force generating unit to generate the braking force even in the state that the brake operation is not executed when the vehicle stops.

* * * * *